July 14, 1925.
G. STOLLERY ET AL
1,545,986
BASKET BOUQUET
Filed Dec. 7, 1922
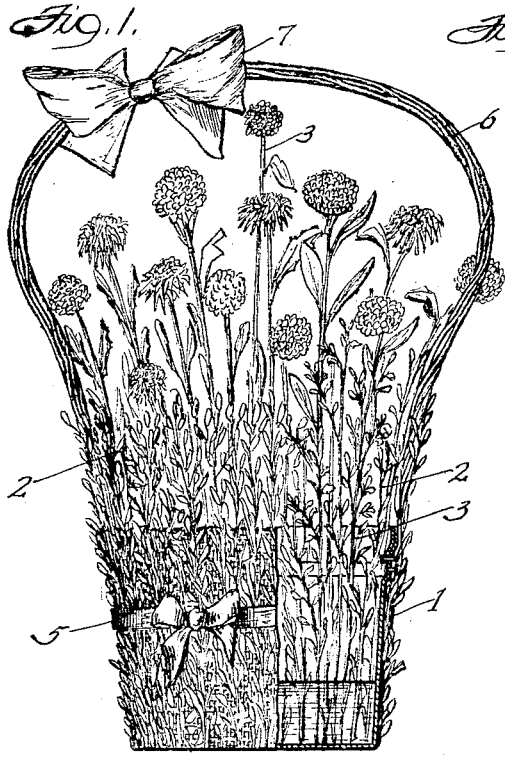
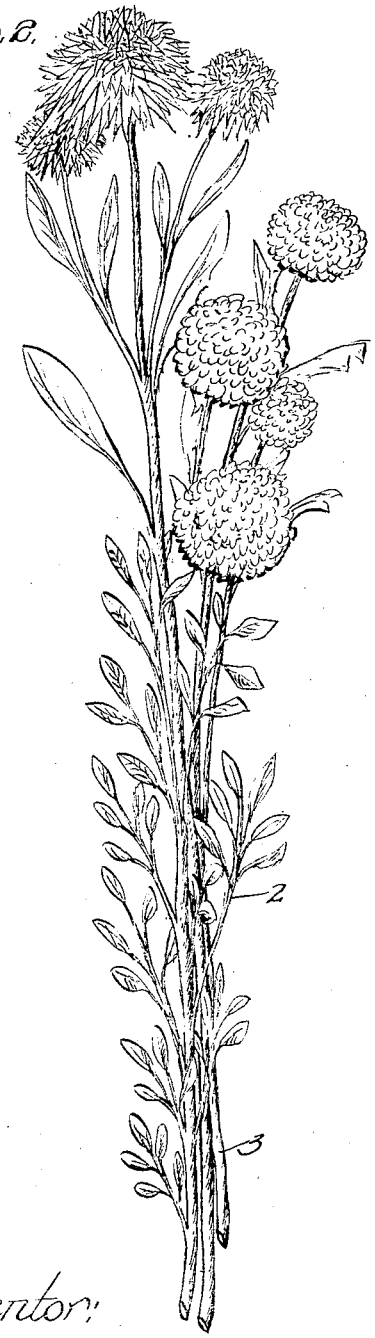
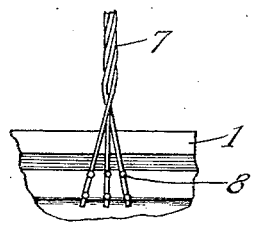
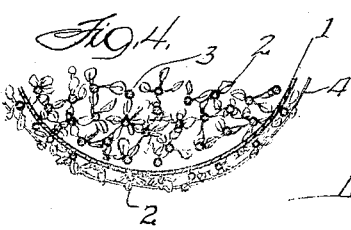
Inventor:
George Stollery
and Fred Stollery
by Albert Scheib, Atty.
Witness:

Patented July 14, 1925.

1,545,986

UNITED STATES PATENT OFFICE.

GEORGE STOLLERY AND FRED STOLLERY, OF CHICAGO, ILLINOIS.

BASKET BOUQUET.

Application filed December 7, 1922. Serial No. 605,534.

*To all whom it may concern:*

Be it known that we, GEORGE STOLLERY and FRED STOLLERY, citizens of the United States, residing at Chicago, in the county of Cook and State of Illinois, have invented certain new and useful Improvements in Basket Bouquets, of which the following is a full, clear, and exact description.

Our invention relates to means for displaying cut flowers artistically, effectively and for unusually long periods of time. Generally speaking, the objects of our invention include the providing of inexpensive and easily assembled means for this general purpose, and more particularly the providing of such means in a form which will readily lend itself to a wide variety of artistic effects and which will permit the resulting floral display to arrive at long distance destinations in first class condition without requiring any portions of the display to be kept in water. Furthermore, our invention provides means for this purpose which can readily be constructed in a variety of sizes and shapes, which can be stored and shipped in a quite compact space, which can easily by assembled by the ordinary florist, which will greatly increase the showing of any given quantity of cut flowers, and which will cause such cut flowers to retain their freshness much longer than they would do if merely kept standing alone in water after the usual custom.

Still further and also more detailed objects of our invention will appear from the following specification and from the accompanying drawings in which Fig. 1 shows a flower basket embodying our invention, this being illustrated with substantially the right hand half of the container portion in vertical section to show a portion of the contents therein.

Fig. 2 is an enlarged view of a portion of the assemblage within the container, showing the manner in which moisture is fed to the stems of the cut flowers at a number of spaced points along these stems.

Fig. 3 is an enlarged side elevation showing the manner of fastening the handle to the container of Fig. 1.

Fig. 4 is a fragmentary horizontal section through the container of Fig. 1, showing a typical distribution of the flower stems and of the moisture carrying sprigs within the container, and also showing the auxiliary sprigs distributed along the exterior of the container.

In the embodiment of the drawings, our invention is shown as employed with flower baskets so as to afford a readily portable display suitable for an endless variety of decorative uses. While growing flowers have often been displayed in this manner by setting the flower pots into baskets of suitable size, this necessarily limits the display of flowers to the blossoms on a particular plant or group of plants. Furthermore, it requires proper attention as to the watering of the plants and does not lend itself readily to transportation for any considerable distance. Furthermore, it requires the florist to have the flowering plants transported from the country gardens or green houses to his place of business in the pots, thus involving far heavier transportation costs than those required for transporting the cut flowers. Moreover, the resulting floral display effects are severely limited by the particular relative position of the blossoms in each pot.

To overcome the above named serious objections to what has heretofore been provided, we desirably start with a water proof container, or at least one having a water proof lower portion. For the more common types of floral displays, such containers are preferably made in a shape resembling ordinary flower pots, but are constructed of water proof paper, thereby permitting them to be inexpensive in manufacture, free from damage under ordinary conditions of handling, light, and impervious to moisture. Furthermore, such containers desirably have upwardly flaring lateral walls so that they can be nested within one another for compact storing and shipping.

Starting with such a container 1, we substantially fill the same with sprigs 2 of an evergreen shrub, such as an evergreen box (or what the florists commonly call a boxwood green), arbor vitæ, or the like, these sprigs being of such a length as to extend for a considerable distance above the upper edge of the container. Then we push the stems 3 of the cut flowers down between these evergreen sprigs so that the stems also will reach the lower portion of the container. This can be done with any cut flowers which have stems longer than the evergreen sprigs, and by first filling the container approximately (although loosely) with the evergreen sprigs, we readily cause these sprigs to hold the flower stems substantially upright, or at any desired angle, and in such a spacing as to display the various flowers in the desired artistic grouping.

The lower portion of the container 1 has water placed in it, which may be done either before or after the sprigs and the flower stems are inserted, but this water need not extend high up into the container, as the moisture carrying character of such evergreen sprigs will cause moisture to rise within the same by capillary action so as to moisten the leaves. Then, since such sprigs commonly have leaves distributed along the length of the same, these leaves by their contact with the flower stems will moisten the flower stems at a large number of vertically spaced points along these stems. Consequently, the supply of moisture to the flower stems is not limited to that which may enter at the lower or cut end of such a stem. In the ordinary displaying of flowers by immersing their stems in water, this dependence of the moistening effect upon the condition of the lower (or cut) end of the stem is well known and is commonly recognized by the practice of clipping the stem ends from day to day so as to cut off the extreme end which rapidly becomes inadequate for transmitting the required moisture. This characteristic of ordinary flower stems does not hold true of the twigs of evergreen shrubs such as those mentioned above, hence these twigs or sprigs will operate continuously for a large number of days in carrying moisture upwards, and by employing them for feeding this moisture through the sides of the flower stems into the latter we secure a greatly prolonged moistening effect.

Indeed, we can secure such a moistening effect for a considerable period of time from previously moistened sprigs without having any water whatever in the container. Owing to this fact, we can readily pour off the water after the evergreen and flower assembly has stood in the same for a short time, thereby permitting the entire assembly to be packed in an ordinary carton or the like and to be shipped without particular regard to the position of the carton. For example, we have found such assemblages after being shipped without water for distances of even five hundred miles arrived at their destination in first class condition. Furthermore, the moistening of the flower stems to relatively high points along the same through their exterior, and regardless of the condition of the lower stem ends readily, enables us to increase the life of the flowers by fully one half, thereby adding greatly to the satisfaction which such floral displays give to the purchasers.

Moreover, the contrast between the green leaves of such evergreen sprigs and the color of almost all flower blossoms enables these same sprigs to afford a highly artistic background, so that a given quantity of cut flowers will make a much greater showing than they would if placed by themselves. So also, since each flower stem can be inserted between the evergreen sprigs at any desired point in the container and, if desired, at any suitable angle to the vertical, we are able to place the various blossoms in such relative positions as will give any desired general artistic effect.

To enhance this artistic effect still further, we desirably cover the exterior of the container also with similar sprigs. For this purpose, we desirably bind the sprigs to the lateral wall of the container by means of a fine wire 4 and then conceal this wire by a ribbon 5. By having these exterior sprigs extend above the container so that their leaves contact within the sprigs housed by the container, we cause the inner sprigs to feed moisture to the outer ones. Hence the latter remain fresh also and do their share towards producing the desired artistic effect for a period of time very much longer than that for which displays of cut flowers could be maintained in display condition by the methods and means heretofore employed. The inner and outer sprigs moreover extend above the container top for such distances as to cause same to support the stems of the flowers and hold same vertically against any drooping tendency. We are aware that moss and charcoal have been used as moisture retainers, but same inherently cannot extend above the container top sufficiently for the purpose of supporting the flower stems.

To increase the portability of such a floral display and to add further to the artistic effect, we desirably provide each container with a suitable handle 6 designed for affording a basket effect which handle may be decorated also, as by a ribbon 7. Such handles are preferably made of twists of willow and are readily fastened to the walls of the container by staples or rivets 8 after the manner shown in Fig 3, so that the handles can be carried in stock separately from the containers or pots. This enables us to store all of the needed parts in a very compact space and likewise greatly reduces the required shipping space and transportation charges.

However, while we have illustrated and described our invention as embodied in a flower basket type of display employing a container formed in imitation of a flower pot, we do not wish to be limited to these or other details of the construction and arrangement above disclosed. Obviously, many changes might be made in the same without departing either from the spirit of our invention or from the appended claims.

We claim as our invention:—

1. A bouquet including a container, a filling of moistened evergreen sprigs in the container extending at their lower ends adjacent the lower portion thereof, cut flowers having their stems wedged between the sprigs and extending to adjacent the lower portion of the container, said sprigs and flower stems being arranged so that the leaves of the sprigs engage the stems throughout the lengths of the sprigs thereby to impart their moisture to the stems throughout corresponding lengths of the stems, the upper ends of the sprigs extending for such distance above the upper end of the container as to form supports for the flower stems, and evergreen sprigs secured to and about the periphery of the container and having their upper portions in contact with the sprigs within the container.

2. A basket bouquet including a container, a filling of moistened evergreen sprigs in the container, cut flowers having their stems wedged between the sprigs, evergreen sprigs arranged about the periphery of the container, and means to support the last named sprigs in position, the sprigs within and without the container being in engagement with each other and having their upper ends projecting above the container top to such distances as to support the flower stems.

GEORGE STOLLERY.
FRED STOLLERY.